United States Patent [19]

Takafuji et al.

[11] Patent Number: 5,073,772
[45] Date of Patent: Dec. 17, 1991

[54] LIQUID CRYSTAL DISPLAY DEVICE

[75] Inventors: Yutaka Takafuji; Takashi Inami; Hisashi Atarashi, all of Nara, Japan

[73] Assignee: Sharp Kabushiki Kaisha, Osaka, Japan

[21] Appl. No.: 305,779

[22] Filed: Feb. 3, 1989

[30] Foreign Application Priority Data

Feb. 6, 1988 [JP] Japan .................................. 63-26171

[51] Int. Cl.$^5$ ............................................... G09G 3/36
[52] U.S. Cl. ......................................... 340/784; 359/48
[58] Field of Search ................ 340/784; 350/334, 335, 350/336, 337, 345

[56] References Cited

U.S. PATENT DOCUMENTS

| | | | |
|---|---|---|---|
| 3,963,312 | 6/1976 | Wild | 350/337 |
| 4,600,274 | 7/1986 | Morozumi | 340/784 |
| 4,601,546 | 7/1986 | Ohta | |
| 4,714,636 | 12/1987 | Yokono et al. | |
| 4,733,948 | 3/1988 | Kitahara | |
| 4,867,537 | 9/1989 | Aoki et al. | 350/336 |

FOREIGN PATENT DOCUMENTS

| | | | |
|---|---|---|---|
| 152827 | 8/1985 | European Pat. Off. | |
| A1221361 | 5/1987 | European Pat. Off. | |
| 79591 | 6/1981 | Japan | |
| 2146827 | 4/1985 | United Kingdom | 340/784 |

Primary Examiner—Ulysses Weldon
Assistant Examiner—Xiao M. Wu

[57] ABSTRACT

A liquid crystal display device includes a liquid crystal display cell arranged between a first and second polarizers. In the liquid crystal display device, the applied voltage between electrodes is controlled by switching elements so as to drive picture elements defined at the crossings between the first and second transparent electrodes. Further, the light incident to at least a rim portion of a first transparent electrode and the switching elements is shaded by a shading film formed in the liquid crystal display cell.

6 Claims, 4 Drawing Sheets

LIQUID CRYSTAL DISPLAY DEVICE

BACKGROUND OF THE INVENTION

1. Field of the Invention

The present invention relates to a liquid crystal display device, and more particularly, to an active matrix type liquid crystal display device.

2. Description of Prior Art

FIG. 5 is a schematic longitudinal cross-sectional view illustrating the main portion of a conventional active matrix type liquid crystal display device 50.

In the liquid crystal display device 50, a liquid crystal display cell 3 is arranged between two polarizers 1 and 2. It is arranged so that the axes of polarization of the two polarizers are parallel to each other. The liquid crystal display cell 3 includes a transparent insulating substrate 6 of glass on which Thin Film Transistors (TFTs) 4 and transparent conductive picture element electrodes 5 for displaying picture elements are formed. It further includes another transparent insulating substrate 8 of glass on which transparent conductive electrodes 7 are formed so as to oppose to the electrodes 5 of the former substrate 6. Finally, a liquid crystal layer 9 is arranged between the transparent substrates 6 and 8. The TFTs 4 are formed in a matrix form so as to correspond to the respective picture element electrodes 5.

An orientation film 10 is formed on the inner surface of the transparent substrate 6 so as to cover the TFTs 4 and the picture element electrodes 5. Further, an orientation film 11 is formed on the inner surface of the transparent substrate 8 so as to cover the electrodes 7. Nematic liquid crystal molecules contained in the liquid crystal layer 9 are twisted by 90° between the orientation films 10 and 11, while zero voltage is applied between the electrodes 5 and 7. Namely, the nematic liquid crystal molecules in the layer 9 are set in the twisted nematic mode. Shading films 12 are formed between each of the electrodes 7 and the substrate 8 so as to face the respective TFTs 4. Further, color filter layers 13 are also formed on the inner surfaces of the substrate 8 so as to face the respective portions of the picture element electrodes 5 where the TFTs 4 are not formed. In FIG. 5, arrows A and B represent directions of the polarization axes of the polarizer 1 and the polarizer 2, respectively.

FIG. 6 illustrates an enlarged schematic longitudinal cross-sectional view showing the TFT 4 used as a switching element for driving the liquid crystal layer 9 in the liquid crystal display device 50.

In FIG. 6, a gate electrode 14 of a metal film is formed on the surface of the transparent substrate 6, and a gate insulating film 15 is formed thereon. Furthermore, an amorphous silicon hydride film 16 functioning as an active layer is formed on the film 15. Also n+ amorphous silicon hydride films 17 and 18 are formed thereon. In FIG. 6, a numeral 19 denotes an insulating film, and a numeral 20 denotes a metal film.

In the aforementioned liquid crystal display device 50 constructed as described above, a light is emitted from a light source (not shown) arranged on the side of the outer surface of the polarizer 1 as indicated by arrows P. Further, the emitted light is converted to a linearly polarized light by the polarizer 1. The linearly polarized light is transmitted through the transparent substrate 6, the electrode 5, the liquid crystal layer 9, the electrode 7, the color filter layer 13 and the transparent substrate 8, sequentially, and is incident to the polarizer 2.

As described above, since the liquid crystal layer 9 is set in the twisted nematic mode and the respective polarization axes of the polarizers 1 and 2 are in parallel to each other, when zero voltage is applied between the electrodes 5 and 7, the polarization axis of the light transmitted through the polarizer 1 from the light source is twisted by 90° according to the rotary polarization characteristic of the liquid crystal layer 9. Therefore, the polarization axis thereof becomes orthogonal to that of the polarizer 2. This results in the light being prevented from being transmitted through the polarizer 2. On the other hand, since the rotary polarization characteristic of the liquid crystal layer 9 is dissolved when a predetermined voltage is applied between the electrodes 5 and 7, the polarization axis of the light incident to the polarizer 2 is coincident with that of the polarizer 2. This results in the light being transmitted through the polarizer 2.

The voltage to be applied between the electrodes 5 and 7 is controlled by the TFTs 4. The picture elements corresponding to the electrodes 5 and 7 between which the predetermined voltage is applied according to the above operation become a transparent state. Further, a colored display is effected by the transmitted light colored by the color filter layer 13.

By the above operation, the light transmitted through the polarizer 1 and the transparent substrate 6 is incident to the TFTs 4, including the amorphous silicon hydride film 16 having a high photoconductivity for a visible light. In this case, since the gate electrode 14 of metal film functions as a shading film, increase of the OFF current in the TFTs 4, caused by the photoconductivity of the film 16, is prevented. Particularly, in the case that images, for example, are projected onto a screen through a projecting lens in a magnification mode by use of the active matrix type liquid crystal display device using the TFTs 4 having the aforementioned amorphous silicon hydride film 15 as switching elements, an extremely strong light is required as the light source in order to produce a bright display. In this case, the illuminance of the light incident to the liquid crystal display device 50 is in the range of several hundred thousand to several million 1x. In this case, since the gate electrode 14 of the TFT 4 also functions as the shading film, increase of the OFF current in the TFT 4 caused by the photoconductivity is prevented. This results in the degradation of the display characteristics being avoided.

As described above, in the aforementioned conventional active matrix type liquid crystal display device, a display mode is used wherein the light is not transmitted at the time of the application of zero voltage. Further, the light is transmitted by dissolving the rotatory polarization characteristic of the liquid crystal layer 9 when a predetermined voltage is applied. In the display device, because the optical rotatory dispersion is caused in the liquid crystal layer 9, a problem exists in that different electric optical characteristics are obtained, respectively, for lights having different wavelengths such as red, green and blue.

FIG. 7 illustrates the dependency of the transmittance on the root mean square value of the applied voltage with a parameter of the wavelength of light (red, green and blue) in the aforementioned active matrix type liquid crystal display device 50. In FIG. 7, the vertical axis represents the root light transmittance and the horizontal axis represents the root means square value of the applied voltage.

As is apparent from FIG. 7, in the display mode, at the time of the application of approximately zero voltage, when the applied voltage is close to the voltage of black, for example, the liquid crystal layer 9 is in the twisted nematic mode, the leak light caused by the optical rotatory dispersion increases. This results in the color reproductivity being lowered.

In the aforementioned active matrix type liquid crystal display device, if the projecting display is performed for a relatively long time or the display is performed with use of a back lighting apparatus such as a fluorescent lamp, the threshold voltage of the TFT 4 is shifted with lapse of the light projecting time. This results in the degradation of the display characteristic.

FIG. 3 illustrates the relationship between the light projecting time (hours) and the shift amount $\Delta V_{TH}$ (volts) of the threshold voltage of the TFT 4, wherein the visible light having an illuminance of 700,000 1x is projected onto the TFT 4. In FIG. 3, the curve 11 illustrates the shift amount $\Delta V_{TH}$ of the threshold voltage of the TFT 4 in the conventional active matrix type liquid crystal display device 50. As is apparent from the curve 11 of FIG. 3, with lapse of the light projecting time, the threshold voltage of the TFT 4 is gradually shifted.

In order to solve the problem of the degradation of the color reproductivity caused by the optical rotatory dispersion, a method for equalizing the color reproductivities for the respective lights having the wavelengths of red, green and blue has been proposed. According to the method, the color reproductivities for red, green and blue colors are equalized by setting respective gaps (d) of the portions of the liquid crystal cell corresponding to individual picture elements for displaying the red, green and blue colors so as to make the ratio $\Delta n \cdot d/\lambda$ constant n represents the birefringence of the liquid crystal and $\lambda$ represents the wavelength of light. (See, for example, Hotta et al.: SID' 86 Digest. p. 296 (1986)).

However, in this method, it is difficult to set the gap (d) of the liquid crystal cell exactly for every color of red, green and blue. This results in the cost for the mass production being extremely increased.

On the other hand, the present inventors have discovered that the shift of the threshold voltage of the TFT 4 due to the light projection for a relatively long time is caused by a portion 16a of the amorphous silicon hydride film 16 uncovered by the gate electrode 14 (See FIG. 6). However, according to the usual manufacturing process for the TFT, it is extremely difficult to completely remove aforementioned projected portion 16a without providing a bad influence to the characteristics of the TFT.

SUMMARY OF THE INVENTION

An essential object of the present invention is to provide a liquid crystal display device having excellent color display characteristics without causing changes in colors to be displayed and degradation of the display, which might be caused by the light projection for a long time.

According to the present invention, a liquid crystal display device is provided which includes: a first polarizer; a second polarizer; first and second transparent insulating substrates arranged in parallel to each other with a predetermined interval; a liquid crystal display cell arranged between the first and second polarizers, the liquid crystal display cell having a liquid crystal layer arranged between the first and second transparent insulating substrates; first transparent electrodes formed on the inner surface of the first transparent insulating substrate; second transparent electrodes formed on the inner surface of the second transparent insulating substrate so as to cross the first transparent electrodes solidly; a switching device for controlling an applied voltage between said first and second transparent electrodes so as to drive picture elements defined at the crossings between the first and second transparent electrodes; a light source arranged on the outer surface of the second polarizer; and a shading device, arranged on the second transparent insulating substrate, for shading the light incident to at least the rim portion of the first transparent electrode and the switching device; wherein the respective polarization axes of the first and second polarizers are set so that the light emitted from the light source is prevented from being transmitted through the second polarizer, the liquid crystal display cell and the first polarizer at the time of the application of a predetermined voltage between the first and second transparent electrodes, and the light therefrom is allowed to transmit therethrough at the time of the application of zero voltage therebetween.

Accordingly, in the present invention, the light emitted from the light source is transmitted through the second polarizer in the twisted nematic mode. Further, when the twisted nematic mode is dissolved by applying a predetermined voltage between the first and second electrodes, it becomes impossible for the emitted light to transmit through the second polarizer. Therefore, possible changes in the colors due to the optical rotatory dispersion is never caused on the display screen. Thus, the color reproductivity can be improved.

Furthermore, since the light incident to the switching device and the rim portion of the first transparent electrode from the light source through the second polarizer is shaded by the shading device, the degradation of the display characteristic of the switching device can be prevented. Thus, a display with a high contrast can be obtained.

BRIEF DESCRIPTION OF THE DRAWINGS

These and other objects and features of the present invention will become more readily apparent from the following description taken in conjunction with the preferred embodiments thereof, with reference to the accompanying drawings, in which.

DETAILED DESCRIPTION OF THE PREFERRED EMBODIMENTS

The First Preferred Embodiment

Figure 1:
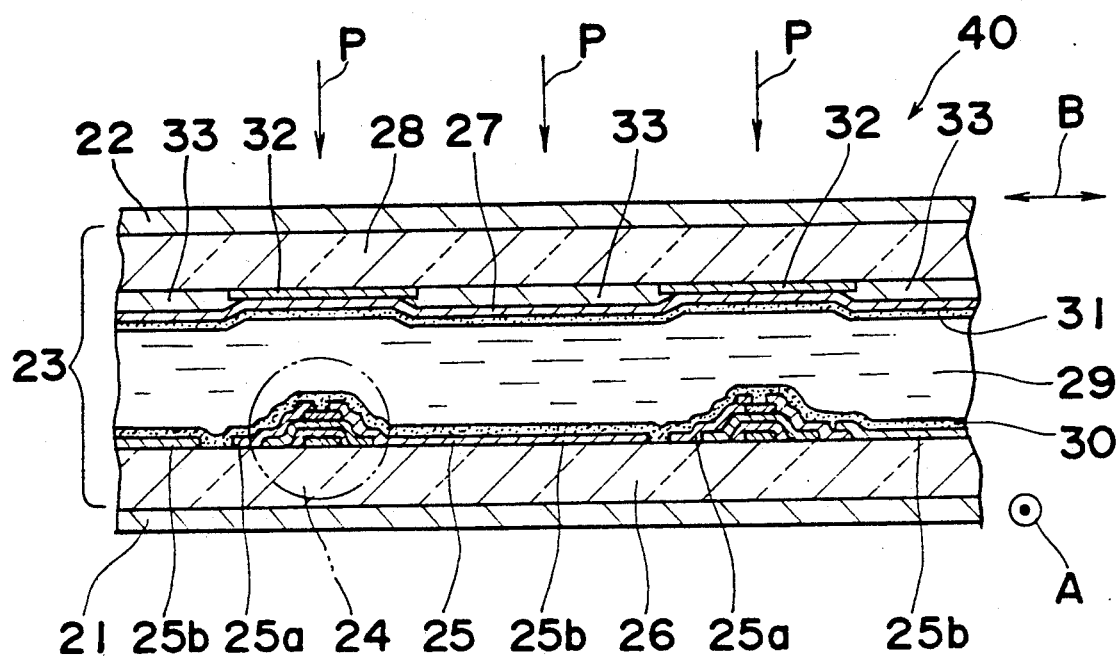
FIG. 1 is a schematic longitudinal cross-sectional view illustrating the main portion of an active matrix type liquid crystal display device of the first preferred embodiment according to the present invention.

FIG. 1 is a schematic longitudinal cross-sectional view illustrating the main portion of an active matrix type liquid crystal display device 40 of the first preferred embodiment according to the present invention.

In the liquid crystal display device 40, a liquid crystal display cell 23 is arranged between the first and second polarizers 21 and 22. It is arranged such that polarization axes thereof are orthogonal to each other. The liquid crystal display cell 23 includes a first transparent insulating substrate 26 of glass onto which TFTs 24, function as switching elements for driving a liquid crystal layer 29, and transparent conductive picture element electrodes 25 for displaying picture elements are formed. A second transparent insulating substrate 28 of glass, is included, onto which transparent conductive electrodes 27 are formed. They are formed so as to oppose to the electrodes 25 of the former substrate 26. The liquid crystal layer 29 is arranged between the transparent substrates 26 and 28. In the liquid crystal display cell 23, the picture element electrodes 25 solidly cross the electrodes 27, respectively, in a known manner.

Figure 6:
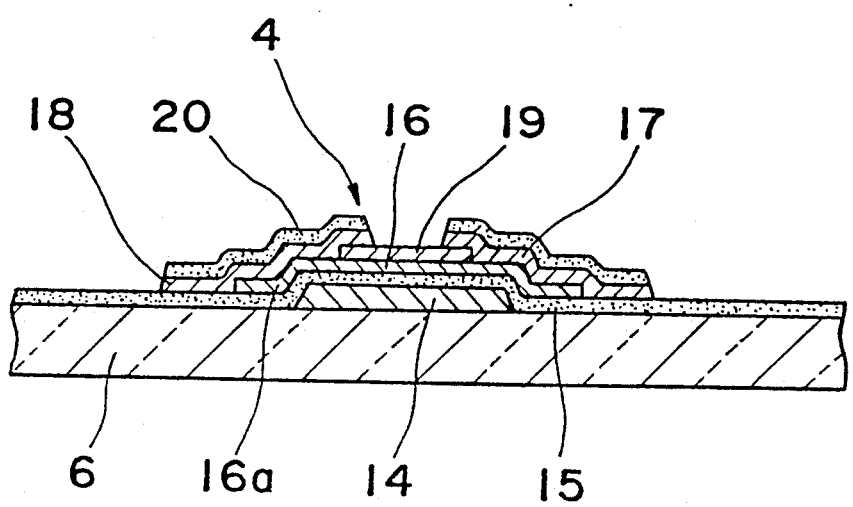
FIG. 6 is an enlarged longitudinal cross-sectional view illustrating a TFT of the liquid crystal display device illustrated in FIG. 5.
Figure 7:
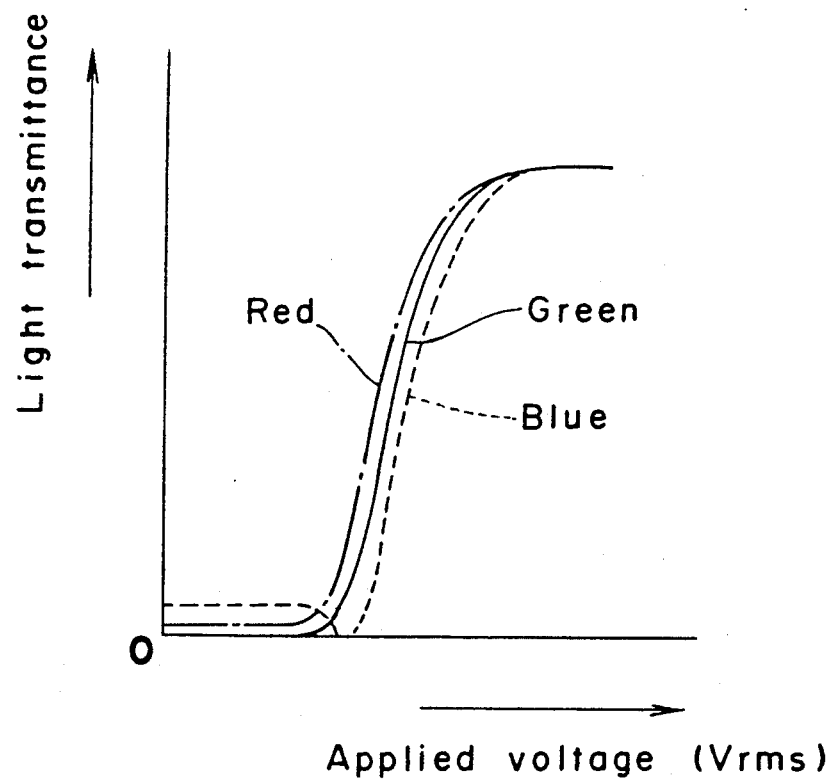
FIG. 7 is a graph illustrated the relationship between the light transmittance and the root square value of the applied voltage in the liquid crystal display device illustrated in FIG. 5.

The structure of the TFT 24 is the same as that of the conventional TFT 4 shown in FIG. 6, therefore, the description thereof is omitted. The TFTs 24 are formed in a matrix formed so as to correspond to the respective electrodes 25.

An orientation film 30 is formed on the inner surface of the transparent substrate 26 so as to cover the TFTs 24 and the picture element electrodes 25. Further, an orientation film 31 is formed on the inner surface of the transparent substrate 28 so as to cover the electrodes 27. Nematic liquid crystal molecules contained in the liquid crystal layer 29 are twisted by 90° between the orientation films 30 and 31, while zero voltage is applied to the liquid crystal layer 29. Namely, the nematic liquid crystal molecules in the layer 29 are set in the twisted nematic mode. Thus, the polarization axis of the light incident to the first polarizer 21 after transmitting through the liquid crystal layer 29 becomes parallel to that of the first polarizer 21 and the polarization axis of the light incident to the second polarizer 22 after transmitting through the liquid crystal layer 29 becomes parallel to that of the second polarizer 22.

Shading films 32 are formed between each of the electrodes 27 and the substrate 28 so as to face the whole area of the respective TFTs 24 and the rim portions 25a of the electrodes 25. Further, color filter layers 33 are also formed on the inner surface of the substrate 28 so as to face the respective main portions 25b of the picture element electrodes 25, other than the rim portions 25a thereof. Since the aforementioned shading films 32 are formed so as to correspond to the respective TFTs 24 and the respective electrodes 25, the shading films 32 have a lattice shape. The shading films 32 are preferably made of metal such as Cr, Ni, Al and Ni-Cr.

Further, the shading films 32 may be a gelatin film or an organic high polymer colored with a dye or a pigment.

In FIG. 1, an arrow A having a vertical direction to the surface of the paper represents a direction of the polarization axis of the first polarizer 21. Further, arrows B represent a direction of the polarization axis of the second polarizer 22.

Figure 2:
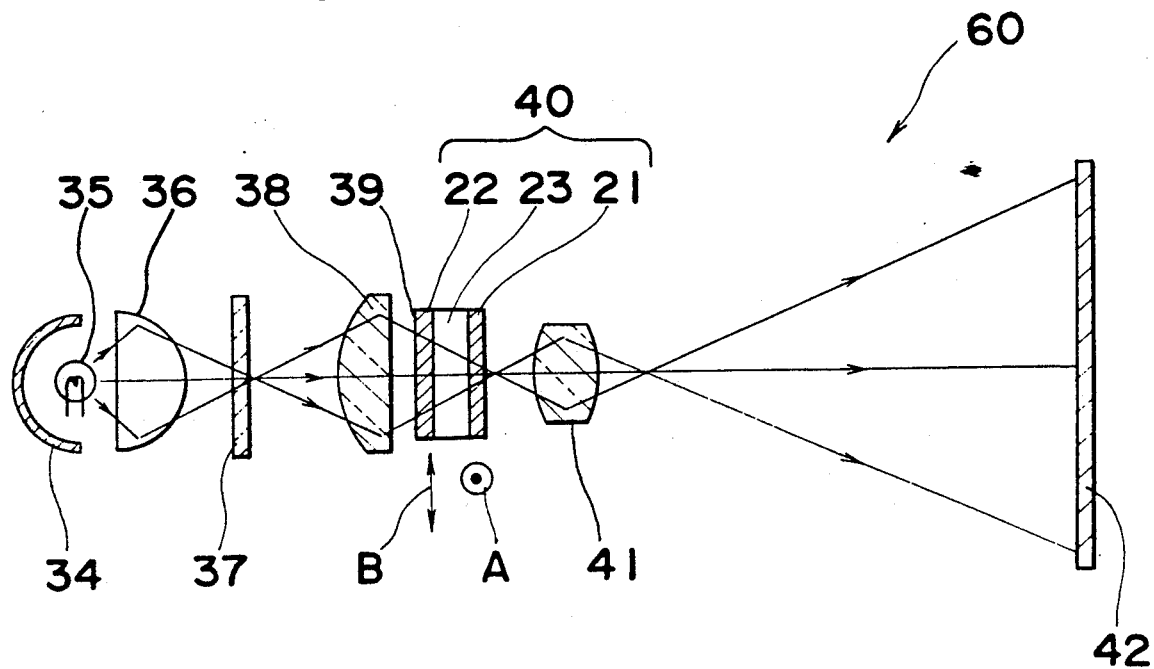
FIG. 2 is a schematic diagram illustrating a projecting type display optical system having the liquid crystal display device illustrated in FIG. 1.

FIG. 2 is a schematic view illustrating a projecting type display optical system 60 including the aforementioned liquid crystal display device 40.

In the projecting type display optical system 60, a mirror 34, a light source 35, the first condenser lens 36, a filter 37 for cutting heat rays, the second condenser lens 38, a filter 39 for cutting ultraviolet rays, the liquid crystal display device 40, a projecting lens 41 and a screen 42 are sequentially arranged. The liquid crystal display device 40 is arranged so that the second polarizer 22 thereof is directed to the light source 35. In this case, the light source 35 is preferably a halogen lamp, a xenon lamp, or a metal halide lamp in order to produce a bright display.

The operation of the aforementioned liquid crystal display device 40 will be described below.

In FIG. 2, the light emitted from the light source 35 is condensed by the mirror 34 and the first condenser lens 36. The condensed light is transmitted through the filter 37 for cutting heat rays, and the transmitted light is incident to the second condenser lens 38. The light transmitted through the second condenser lens 38 is transmitted through the filter 39 for cutting ultraviolet rays. Further, it is incident to the second polarizer 22 of the liquid crystal display device 40. The light thereof is illustrated by an arrow P of FIG. 1.

In the liquid crystal display device 40, the light incident to the second polarizer 22 becomes a linearly polarized light. Light thereof is then transmitted through the second transparent substrate 28, the color filter layer 33, the electrode 27, the liquid crystal layer 29, the electrode 25 and the first transparent substrate 26, sequentially. Thereafter, the transmitted light is incident to the first polarizer 21.

As described above, the liquid crystal layer 29 is set in the twisted nematic mode in which the liquid crystal molecules contained in the layer 29 are twisted by 90°. Further the first and second polarizers 21 and 22 are arranged so that the polarization axes thereof are orthogonal to each other. Therefore, at the time of the application of zero voltage between the electrodes 25 and 27, the polarization axis of the light transmitted through the second polarizer 22 after emitting from the light source 35 is twisted by 90° according to the rotary polarization characteristic of the liquid crystal layer 29 and is parallel to the polarization axis of the first polarizer 21. This results in the light being allowed to be transmitted through the first polarizer 21. On the other hand, at the time of the application of a predetermined voltage between the electrodes 25 and 27, the rotary polarization characteristic of the liquid crystal layer 29 is dissolved and the polarization axis of the light incident to the first polarizer 21 is orthogonal to that of the first polarizer 21. This results in the light being prevented from transmitting through the first polarizer 21.

Thus, when the voltage applied between the electrodes 25 and 27 is controlled by the TFTs 24, the light transmittance of the respective picture elements is changed. Then, the transmitted light colored by the color filter layer 33 is transmitted through the projecting lens 41. The enlarged image is then formed on the screen 42 with a colored display.

In the aforementioned operation, at the time of the application of zero voltage, the liquid crystal layer 29 is set in the twisted nematic mode and the phenomenon of the optical rotary dispersion appears in the layer 29. However, since the light is transmitted therethrough, almost no change of the color due to the optical rotary dispersion is caused on the display screen 42. On the other hand, at the time of the application of a predetermined voltage, when the light is not almost transmitted therethrough, the twist of the polarization axis of the liquid crystal layer 29 is almost dissolved. Therefore, the phenomenon of the optical rotatory dispersion almost does not appear in the layer 29. This results in the leak light due to the optical rotary dispersion, not being caused. Namely, the display, with use of the liquid crystal display device 40, has an extremely fine color reproductivity.

Furthermore, since the shading film 32 formed on the second transparent substrate 28 prevents the light from the light source 35 from being incident to the TFT 24, the shift of the threshold voltage of the TFT 24 due to the light projection for a relatively long time is prevented.

Figure 3:
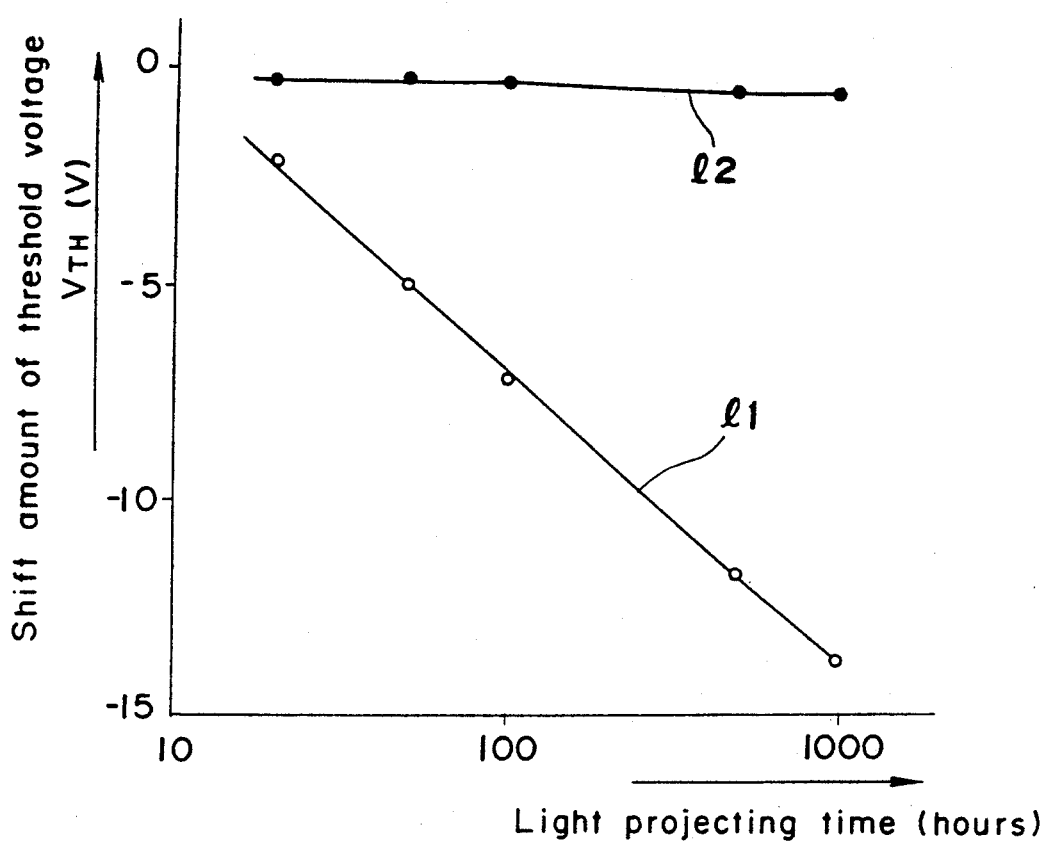
FIG. 3 is a graph illustrating the change of the threshold voltage of TFT in the liquid crystal display device illustrated in FIG. 1 and the threshold voltage of TFT in a conventional liquid crystal display device illustrated in FIG. 5 with lapse of the light projecting time.

The curve 12 of FIG. 3 illustrates the relationship between the light projecting time (hours) of the visible light having an illuminance of 700,000 lx incident to the TFT 24 in the liquid crystal display device 40 and the shift amount $\Delta V_{TH}$ (volts) of the threshold voltage of the TFT 24.

As is apparent from the curve 12 of FIG. 3, even with lapse of the light illumination time, the threshold voltage of the TFT 24 is not almost shifted. Therefore, the degradation of the display characteristic can be prevented. Even when a predetermined voltage is applied to the layer 29, the applied voltage does not influence the shading film 32. Further, the shading film 32 is also used for shading the light transmitted through the rim portions 25a of the electrodes 25 which cannot shade the light. This results in that the display with a high contract, being obtained.

It is to be noted that, in the construction of the projecting type display optical system 60 illustrated in FIG. 2, the color filter layer 33 is used as a means for separating colors. However, a dichroic mirror or a dichroic prism may be used as the means for separating colors. Furthermore, the arrangement of the color filter layer 33 is not limited to the case where the color filter layer 33 is arranged between the second and first polarizers 22 and 21.

THE SECOND PREFERRED EMBODIMENT

Figure 4:
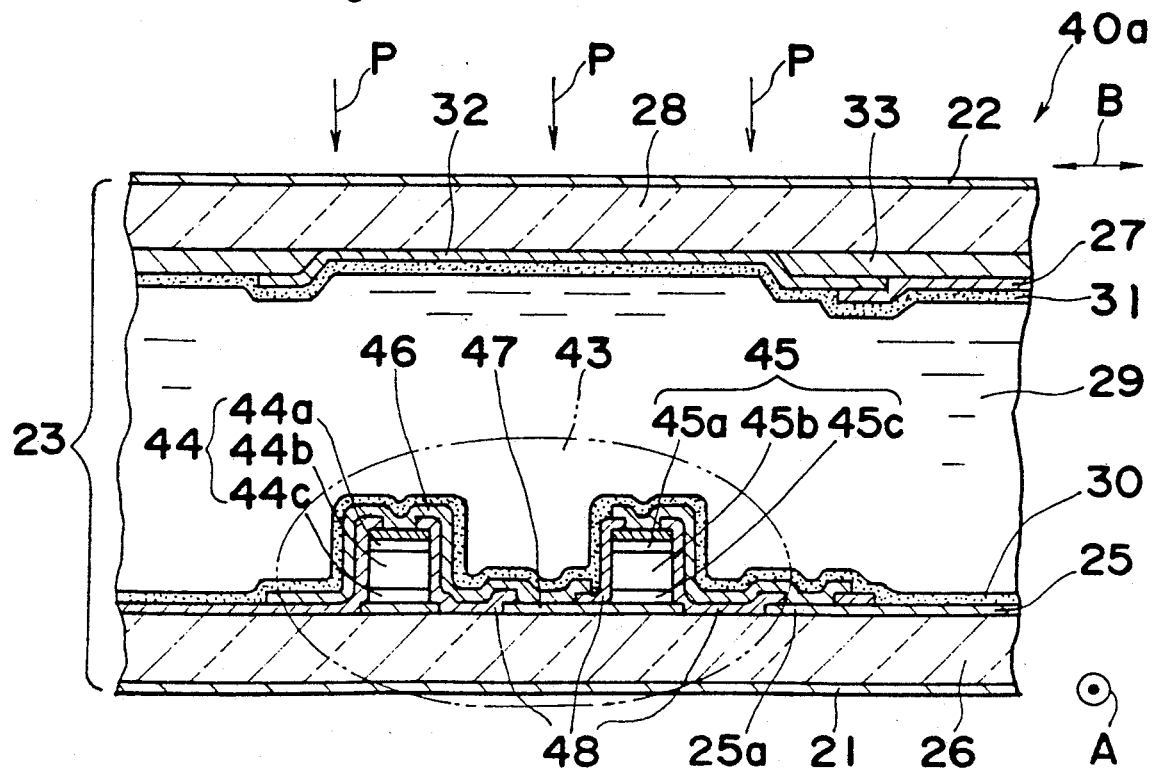
FIG. 4 is a schematic longitudinal cross-sectional view illustrating the main portion of an active matrix type liquid crystal display device of the second preferred embodiment according to the present invention.
Figure 5:
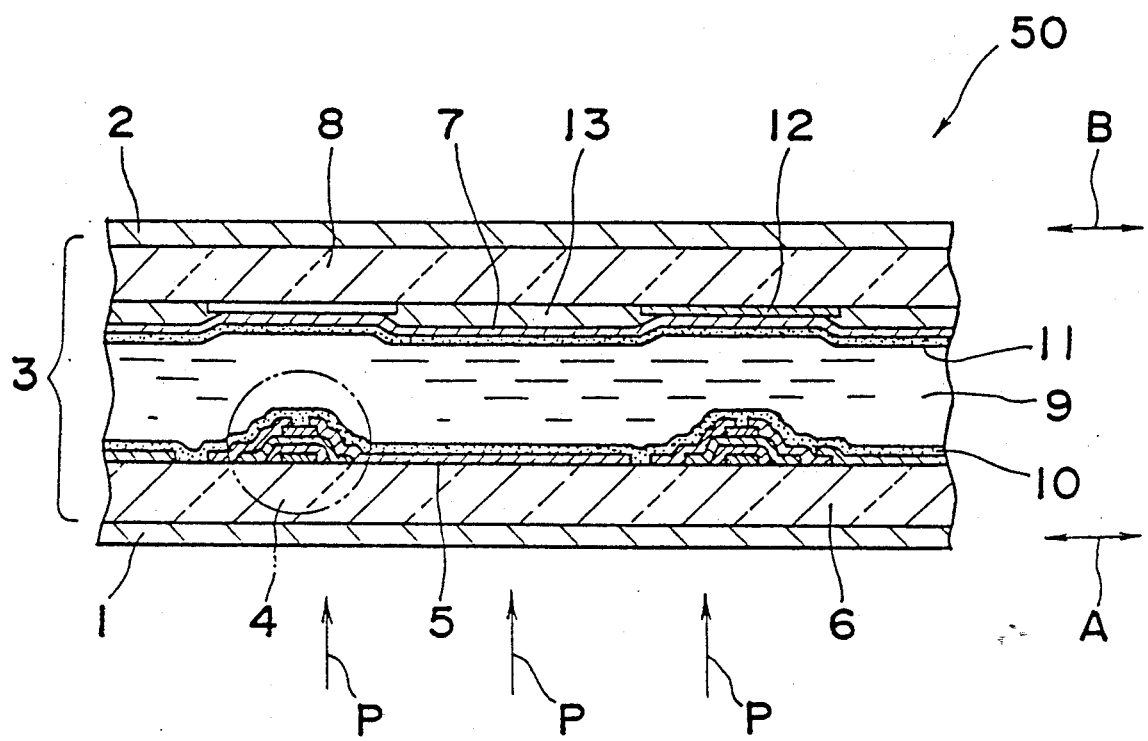
FIG. 5 is a schematic longitudinal cross-sectional view illustrating the main portion of a conventional matrix type liquid crystal display device.

FIG. 4 is a schematic longitudinal cross-sectional view illustrating the main portion of an active matrix type liquid crystal display device 40a of the second preferred embodiment according to the present invention. The liquid crystal display device of the second preferred embodiment includes a non-linear type element used as the switching element for driving the liquid crystal layer 29. Further, the other construction thereof is the same as that of the liquid crystal display device 40 of the first preferred embodiment. Therefore, in FIG. 4, the same components of the liquid crystal display device 40 are denoted respectively by the same numerals as those of the components of the liquid crystal display device 40 of the first preferred embodiment, and thus the descriptions thereof are omitted.

A ring diode is used as the non-linear element 43, wherein the ring diode includes two diodes 44 and 45 connected in parallel so that the forward direction of one diode is parallel to the backward direction of another diode. Further, the diodes 44 and 45 have an amorphous silicon hydride film of the PIN junction type as an active layer. The shading film 32 for shading the light transmitting through the whole area of the non-linear type element 43 and the rim portion 25a of the electrode 25 must be an insulating film. Further, the shading film 32 is preferably a gelatin film or a high polymer film colored with a dye or a pigment.

In FIG. 4, the diode 44 includes an n-layer 44a, an i-layer 44b and a p-layer 44c. Further, the diode 45 includes an n-layer 45a, an i-layer 45b and a p-layer 45c. The numerals 46 and 47 denote metal films, and the numeral 48 denotes an insulating film. Furthermore, in FIG. 4, an arrow A having a vertical direction to the surface of the paper represents a direction of the polarization axis of the first polarizer 21, and arrows B represent a direction of the polarization axis of the second polarizer 32.

The non-linear type element 43 may be the aforementioned two diodes 44 and 45, connected in series to each other in a forward direction or a backward direction thereof, and the non-linear type element 43 may also be a Schottky junction element, or a so-called Metal Insulator Metal element.

It is understood that various other modifications will be apparent to, and can be readily made by, those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A projection type liquid crystal display device comprising:
   a first polarizer;
   a second polarizer;
   first and second transparent insulating substrates arranged in parallel to each other;
   a liquid crystal display cell arranged between said first and second polarizers for displaying an image thereon, said liquid crystal display cell including a liquid crystal layer arranged between said first and second transparent insulating substrates;
   first transparent electrodes formed on an inner surface of said first transparent insulating substrate;
   second transparent electrodes formed on an inner surface of said second transparent insulating substrate so as to cross said first transparent electrodes;
   switching means, including a transistor arranged on an inner surface of said first transparent insulating substrate, for controlling an applied voltage between said first and second transparent electrodes so as to drive picture elements defined at the crossings between said first and second transparent electrodes, said switching means including a gate electrode of the transistor formed on the inner surface of said first transparent insulating substrate, an electrically insulating film formed on said gate electrode, a semiconductor film formed on said electrically insulating film and a source electrode and a drain electrode of the transistor formed on said semiconductor film, wherein thickness of said semiconductor film is greater than thickness of said gate electrode;

a light source, arranged on the side of an outer surface of said second polarizer, for emitting light through said second polarizer, said second transparent insulating substrate, said liquid crystal display cell, said first transparent insulating substrate and said first polarizer toward a display screen arranged on the side of an outer surface of said first polarizer, said emitted light having a large enough intensity so as to project an image displayed on said liquid crystal display cell onto said display screen so that said projected image can be viewed; and shading means arranged on the second transparent insulating substrate for shading light incident to at least a rim portion of said first transparent electrode and said switching means;

wherein the respective polarization axes of said first and second polarizers are set so that the light emitted from said light source is prevented from transmitting through said second polarizer, said liquid crystal display cell and said first polarizer, at the time of the application of a predetermined voltage between said first and second transparent electrodes, and the light therefrom is allowed to transmit therethrough at the time of the application of zero voltage therebetween.

2. A liquid crystal display device as claimed in claim 1, wherein said switching means includes Thin Film Transistors.

3. A liquid crystal display device as claimed in claim 1, wherein said switching means includes non-linear type elements.

4. A liquid crystal display device as claimed in claim 3, wherein the non-linear type elements are comprised of two diodes connected in parallel or in series, a Schottky junction element, or a Metal Insulator Metal element.

5. A liquid crystal display device as claimed in claim 1, wherein said shading means includes a metal film made of Cr, Ni, Al, or Ni-Cr.

6. A liquid crystal display device as claimed in claim 1, wherein said shading means includes a gelatin film or an organic high polymer film colored with a dye or a pigment.

* * * * *